United States Patent
Kao

(10) Patent No.: US 7,777,803 B2
(45) Date of Patent: Aug. 17, 2010

(54) ANTI-SHADING METHOD AND APPARATUS FOR IMAGE SENSOR

(75) Inventor: Chang-Jung Kao, Jhonghe (TW)

(73) Assignee: Quanta Computer Inc., Tao Yuan Shien (TW)

(*) Notice: Subject to any disclaimer, the term of this patent is extended or adjusted under 35 U.S.C. 154(b) by 1092 days.

(21) Appl. No.: 11/331,746

(22) Filed: Jan. 12, 2006

(65) Prior Publication Data

US 2007/0013806 A1 Jan. 18, 2007

(30) Foreign Application Priority Data

Jul. 13, 2005 (TW) .............................. 94123703 A

(51) Int. Cl.
*H04N 5/235* (2006.01)
*H04N 5/57* (2006.01)
*G06K 9/40* (2006.01)
(52) U.S. Cl. .................. 348/362; 348/687; 382/274
(58) Field of Classification Search .................. 382/274
See application file for complete search history.

(56) References Cited

U.S. PATENT DOCUMENTS

| 6,724,438 | B2 | 4/2004 | Lee et al. |
| 2001/0020983 | A1* | 9/2001 | Lee et al. .................... 348/687 |
| 2002/0012055 | A1* | 1/2002 | Koshiba et al. ............. 348/273 |

* cited by examiner

*Primary Examiner*—Luong T Nguyen
(74) *Attorney, Agent, or Firm*—Thomas, Kayden, Horstemeyer & Risley

(57) ABSTRACT

This invention discloses an adjusting apparatus for adjusting the brightness of an image including a plurality of pixels having a center pixel and an initial pixel. The adjusting apparatus includes a detecting module, a calculating module and a gain module. The detecting module receives the image and detects the brightness of each pixel of the image. The calculating module calculates the distance between each pixel and the center pixel according the distance between initial pixel and the center pixel. The gain module respectively adjusts the brightness of each pixel among the plural pixels according to the distance between each pixel and the center pixel of the image.

8 Claims, 5 Drawing Sheets

ANTI-SHADING METHOD AND APPARATUS FOR IMAGE SENSOR

BACKGROUND OF THE INVENTION

1. Field of the Invention

This present invention is related to an adjusting apparatus. More specifically, this invention is related to an adjusting apparatus for adjusting the brightness of images.

2. Description of the Prior Art

Generally, images provided by digital cameras and projectors have a problem that the brightness of an image is unequal in different areas; in the same image, areas close to edges are darker, areas close to the center are lighter. This problem makes the image inharmonious and viewers might feel uncomfortable about this condition. Accordingly, how to adjust the brightness of an image such that the brightness in each area of the image is average becomes a critical issue in image processing.

To solve the aforementioned problem, the US 2004/0155970 patent application publication proposes a method of using polynomials. The method first selects one pixel from a plurality of pixels in an image as a reference point. Then, with the reference point, polynomials are used to calculate the brightness of the image. The brightness of the image can be compensated based on the calculated results. Besides, the U.S. Pat. No. 4,884,140 patent proposes a method of using analog circuits to compensate the brightness of an image. The US 2003/0052987 patent application publication proposes a method of using digital circuits to compensate the brightness of an image. The two methods using circuits have more complicated calculations. That is to say, compensating the brightness of an image must be performed with complicated circuits. Furthermore, a large number of multipliers used in the circuits slow down the calculation speed and increase the hardware cost.

As known by people skilled in the art, the prior arts not only use complicated circuits with high cost but also take longer processing time with complicated calculations. Therefore, a major objective of the invention is to provide an adjusting apparatus to overcome the aforementioned problems.

SUMMARY OF THE INVENTION

One purpose of this invention is providing an adjusting apparatus that can adjust the brightness of each pixel in an image according to the distance between the pixel and a center pixel of the image. According to this invention, an image includes a plurality of pixels; the plurality of pixels includes a center pixel and an initial pixel.

An embodiment according to this invention is an adjusting apparatus including a detecting module, a calculating module, and a gain module. The detecting module is used for receiving the image and detecting the brightness of each pixel among the plurality of pixels. The calculating module is coupled with the detecting module. Based on the distance between the center pixel and the initial pixel, the calculating module respectively calculates a distance between each of the plurality of pixels and the center pixel. The gain module is coupled with the calculating module. Based on the distances between each of the plurality of pixels and the center pixel calculated by the calculating module, the gain module respectively adjusts the brightness of each of the plurality of pixels.

The adjusting apparatus calculates a distance between each of the plurality of pixels and the center pixel based on the distance between the center pixel and the initial pixel. Thus, this invention doesn't have to calculate the distance between each pixel and the center pixel and the calculation time is accordingly reduced. Furthermore, the adjusting apparatus in this invention only needs shifter and adder. Since the circuits of this invention are sampler than prior arts, the cost for hardware of this invention is lower than prior arts.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
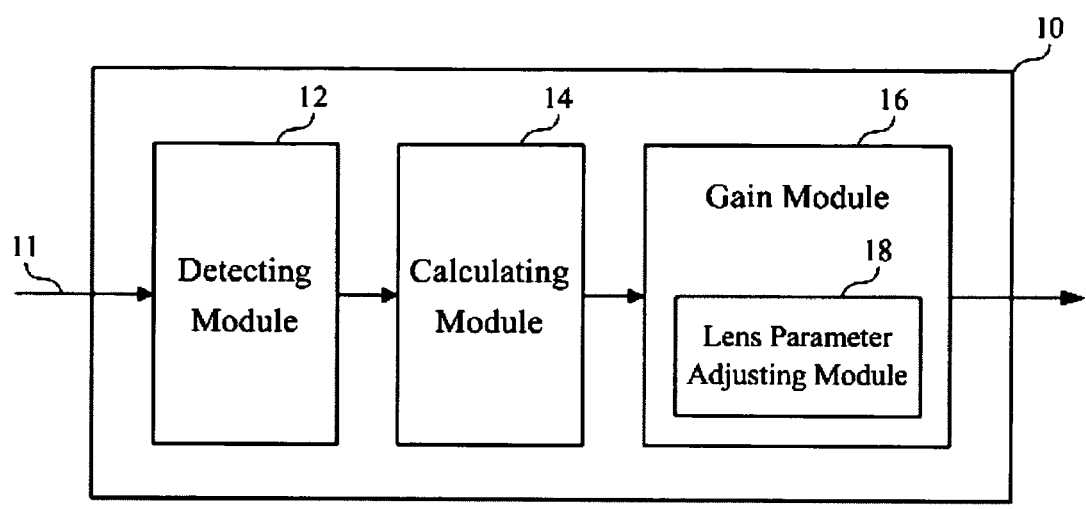
FIG. 1 is the block diagram of the adjusting apparatus according to this invention.
Figure 2:
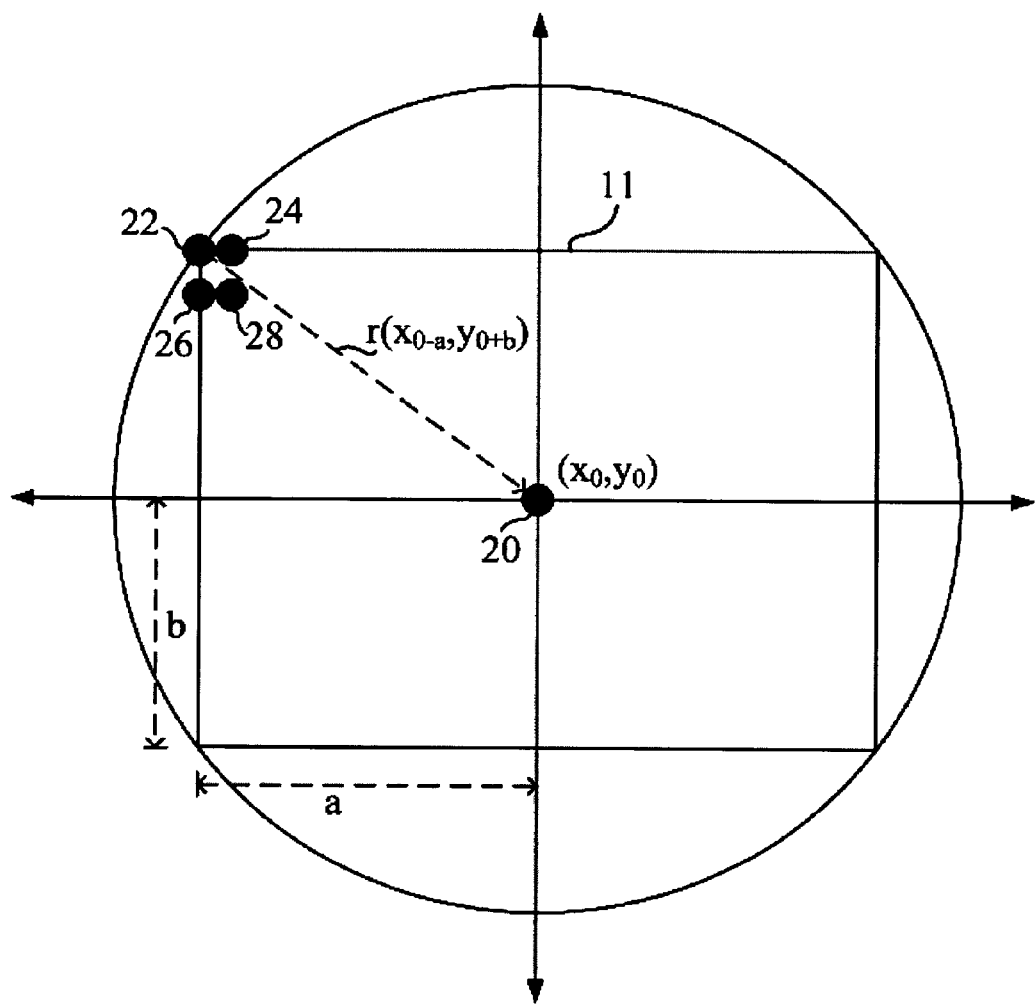
FIG. 2 illustrates a plurality of pixels in an image.

Please refer to FIG. 1 and FIG. 2. FIG. 1 is the block diagram of the adjusting apparatus 10 according to this invention. FIG. 2 illustrates a plurality of pixels in an image 11. The image 11 includes a plurality of pixels; the plurality of pixels includes a center pixel 20 and an initial pixel 22. The adjusting apparatus 10 includes a detecting module 12, a calculating module 14, and a gain module 16.

The detecting module 12 is used for receiving the image 11 and detecting the brightness of each pixel among the plurality of pixels. The calculating module 14 is coupled with the detecting module 12. Based on the distance between the center pixel 20 and the initial pixel 22, the calculating module 14 respectively calculates a distance between each of the plurality of pixels and the center pixel 20.

Each of the plurality of pixels is respectively corresponding to a coordinate. In actual applications, the calculating module 14 respectively performs a shifting calculation on each coordinate to generate a shifted coordinate. Based on the shifted coordinates and the distance between the center pixel 20 and the initial pixel 22, the calculating module 14 generates the distances between each of the plurality of pixels and the center pixel 20.

The gain module 16 is coupled with the calculating module 14. Based on the distances between each of the plurality of pixels and the center pixel 20 calculated by the calculating module 14, the gain module 16 respectively adjusts the brightness of each of the plurality of pixels. The gain module can further include a lens parameter adjusting module 18 for adjusting the brightness of each of the plurality of pixels according to a predetermined lens parameter.

As shown in FIG. 2, the coordinate of the center pixel 20 is $(x_0, y_0)$, the coordinate of the initial pixel is $(x_{0-a}, y_{0+b})$, the distance between the center pixel 20 and the initial pixel 22 is represented as $r(x_{0-a}, y_{0+b})$, the coordinate of a first pixel 24 in the same row as the initial pixel 22 is $(x_{0-a+i}, y_{0+b})$, and the distance between the center pixel 20 and the first pixel 24 is represented as $r(x_{0-a+i}, y_{0+b})$, wherein i is an integer. The $r(x_{0-a+i}, y_{0+b})$ can be represented as:

$$r^2(x_{0-a+i}, y_{0+b}) = r^2(x_{0-a+i-1}, y_{0+b}) - ((a-i+1) << 1) + 1,$$

wherein $((a-i+1) << 1)$ represents performing the shifting calculation on $(a-i+1)$ toward left.

Also as shown in FIG. 2, the coordinate of a second pixel 26 in the same column as the initial pixel 22 is $(x_{0-a}, y_{0+b-j})$, and the distance between the center pixel 20 and the second pixel 26 is represented as $r(x_{0-a}, y_{0+b-j})$, wherein j is an integer. The $r(x_{0-a}, y_{0+b-j})$ can be represented as:

$$r^2(x_{0-a}, y_{0+b-j}) = r^2(x_{0-a}, y_{0+b-j+1}) - ((b-j+1) \ll 1) + 1,$$

wherein $((b-j+1) \ll 1)$ represents performing the shifting calculation on $(b-j+1)$ toward up.

The coordinate of a third pixel 28 in the same row as the second pixel 26 is $(x_{0-a+i}, y_{0+b-j})$. The distance between the center pixel 20 and the third pixel 28 is represented as $r(x_{0-a+i}, y_{0+b-j})$. The $r(x_{0-a+i}, y_{0+b-j})$ can be represented as:

$$r^2(x_{0-a+i}, y_{0+b-j}) = r^2(x_{0-a+i-1}, y_{0+b-j}) - ((a-i+1) \ll 1) + 1,$$

wherein $((a-i+1) \ll 1)$ represents performing the shifting calculation on $(a-i+1)$ toward left.

With the equations above, the distance between each of the plurality of pixels and the center pixel 20 can be calculated based on the distance between the center pixel 20 and the initial pixel 22. Based on the distances between each of the plurality of pixels and the center pixel 20 calculated, the brightness of each of the plurality of pixels are adjusted.

Figure 3:
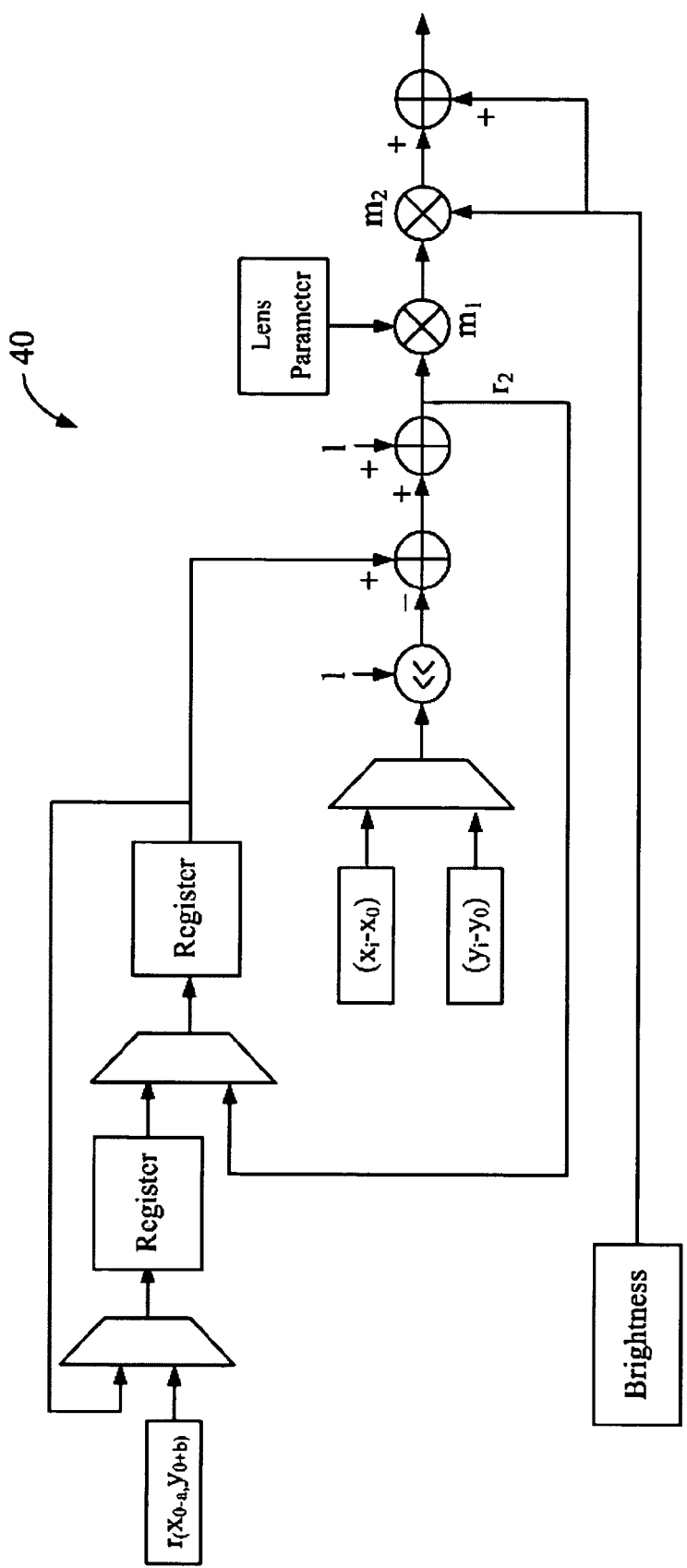
FIG. 3 shows another embodiment of the adjusting apparatus according to this invention.

Referring to FIG. 3, another embodiment according to this invention is illustrated. In this embodiment, the distance between the initial pixel and the center pixel is first inputted to the adjusting apparatus 40. The relative positions of the plurality of pixels with the initial pixel are then inputted. The relative positions of the plurality of pixels with the initial pixel in the x axis and the y axis are respectively performed a shifting calculation. The results of the shifting calculation are then added with the distance between the initial pixel and the center pixel. A constant, 1, is also added in this embodiment. The sums of addition are the distances between the pixels and the center pixel. Then, the distances are respectively multiplied with a predetermined lens parameter. The brightness of each of the plurality of pixels is adjusted according to the corresponding multiplied result.

Figure 4:
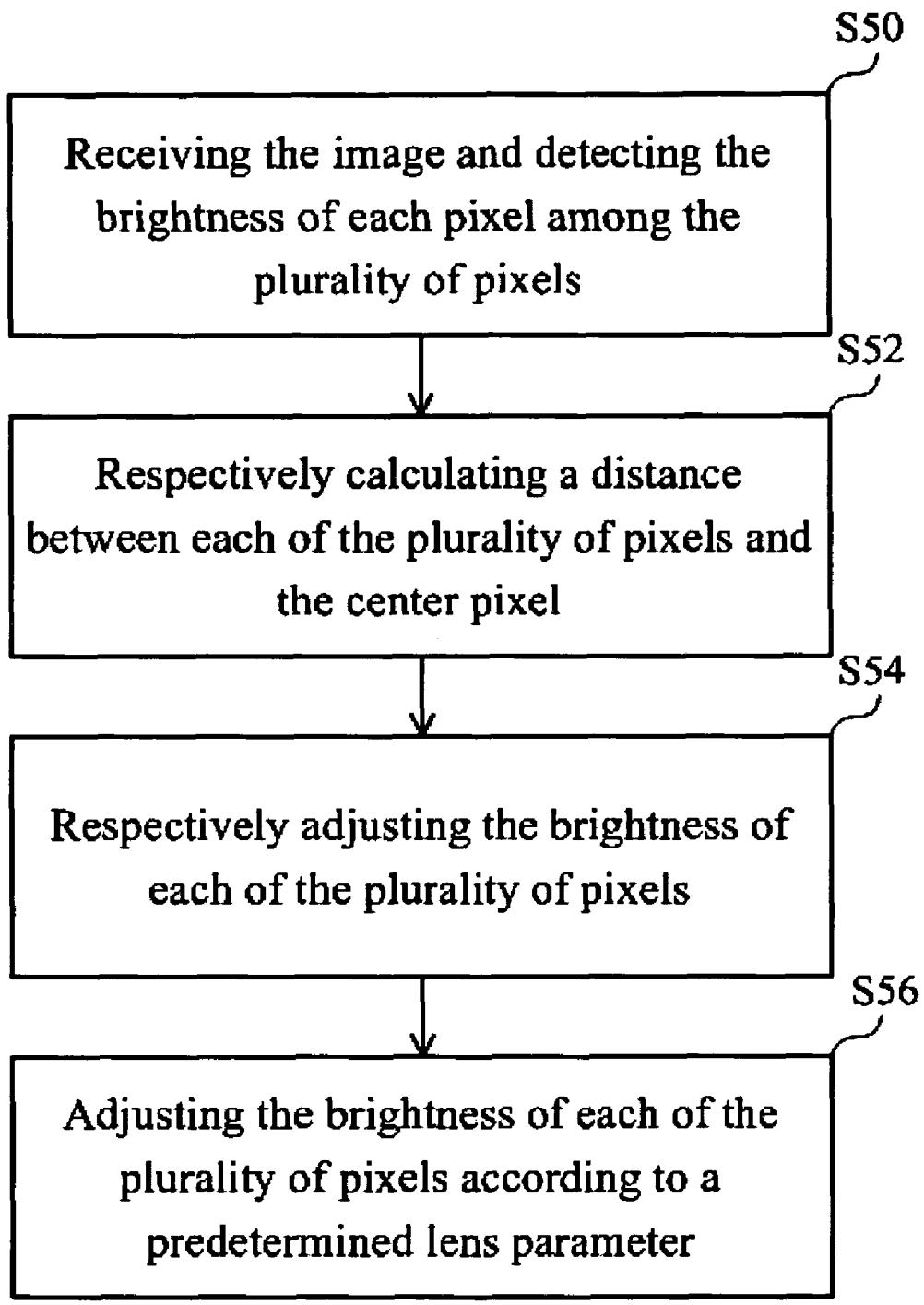
FIG. 4 is the flowchart of the adjusting method according to this invention.

Referring to FIG. 4, the flowchart of the adjusting method according to this invention is illustrated. The method first performs step S50 for receiving the image and detecting the brightness of each pixel among the plurality of pixels. Step S52 is respectively calculating a distance between each of the plurality of pixels and the center pixel based on the distance between the center pixel and the initial pixel. Step S54 is respectively adjusting the brightness of each of the plurality of pixels based on the distances between each of the plurality of pixels and the center pixel.

The adjusting method can further including step S56 for adjusting the brightness of each of the plurality of pixels according to a predetermined lens parameter.

Figure 5:
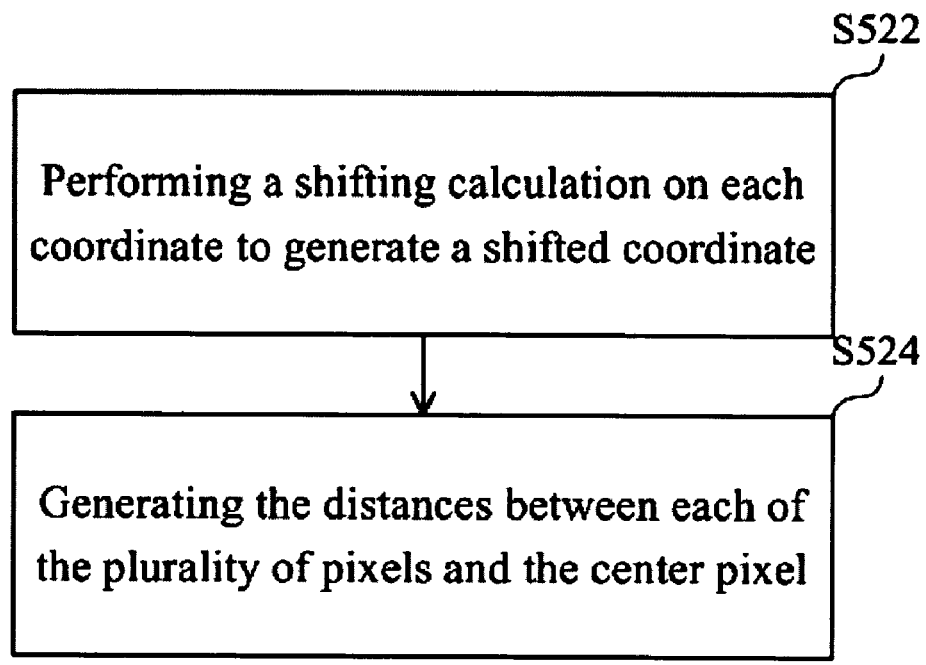
FIG. 5 is the flowchart of how to calculate the distances between the plurality of pixels and the center pixel according to this invention.

Please refer to FIG. 5. FIG. 5 is the flowchart of how to calculate the distances between the plurality of pixels and the center pixel according to this invention. Step S52 in FIG. 4 can further include steps S522 and S524. Step S522 is performing a shifting calculation on each coordinate to generate a shifted coordinate. Step S524 is generating the distances between each of the plurality of pixels and the center pixel based on the shifted coordinates and the distance between the center pixel and the initial pixel.

The coordinate of the center pixel is $(x_0, y_0)$, the coordinate of the initial pixel is $(x_{0-a}, y_{0+b})$, the distance between the center pixel and the initial pixel is represented as $r(x_{0-a}, y_{0+b})$, the coordinate of a first pixel in the same row as the initial pixel is $(x_{0-a+i}, y_{0+b})$, and the distance between the center pixel and the first pixel is represented as $r(x_{0-a+i}, y_{0+b})$, wherein i is an integer. The $r(x_{0-a+i}, y_{0+b})$ can be represented as:

$$r^2(x_{0-a+i}, y_{0+b}) = r^2(x_{0-a+i-1}, y_{0+b}) - ((a-i+1) \ll 1) + 1,$$

wherein $((a-i+1) \ll 1)$ represents performing the shifting calculation on $(a-i+1)$ toward left.

The coordinate of a second pixel in the same column as the initial pixel is $(x_{0-a}, y_{0+b-j})$, and the distance between the center pixel and the second pixel is represented as $r(x_{0-a}, y_{0+b-j})$, wherein j is an integer. The $r(x_{0-a}, y_{0+b-j})$ can be represented as:

$$r^2(x_{0-a}, y_{0+b-j}) = r^2(x_{0-a}, y_{0+b-j+1}) - ((b-j+1) \ll 1) + 1,$$

wherein $((b-j+1) \ll 1)$ represents performing the shifting calculation on $(b-j+1)$ toward up.

The coordinate of a third pixel in the same row as the second pixel is $(x_{0-a+i}, y_{0+b-j})$. The distance between the center pixel and the third pixel is represented as $r(x_{0-a+i}, y_{0+b-j})$. The $r(x_{0-a+i}, y_{0+b-j})$ can be represented as:

$$r^2(x_{0-a+i}, y_{0+b-j}) = r^2(x_{0-a+i-1}, y_{0+b-j}) - ((a-i+1) \ll 1) + 1,$$

wherein $((a-i+1) \ll 1)$ represents performing the shifting calculation on $(a-i+1)$ toward left.

The adjusting apparatus calculates a distance between each of the plurality of pixels and the center pixel based on the distance between the center pixel and the initial pixel. Because the distances between the pixels and the initial pixel can be calculated through simple equations, this invention doesn't have to calculate the distance between each pixel and the center pixel directly and the calculation time is accordingly reduced. Furthermore, the adjusting apparatus in this invention only needs shifter and adder. Since the circuits of this invention are sampler than prior arts, the cost for hardware of this invention is lower than prior arts.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjusting apparatus for adjusting the brightness of an image, the image comprising a plurality of pixels, the plurality of pixels comprising a center pixel and an initial pixel, said adjusting apparatus comprising:

a detecting module for receiving the image and detecting the brightness of each pixel among the plurality of pixels;

a calculating module coupled with the detecting module, based on a distance between the center pixel and the initial pixel, the calculating module respectively calculating a distance between each of the plurality of pixels and the center pixel; and a gain module coupled with the calculating module, based on distances between each of the plurality of pixels and the center pixel calculated by the calculating module, the gain module respectively adjusting the brightness of each of the plurality of pixels;

wherein each of the plurality of pixels is respectively corresponding to a coordinate, the calculating module respectively performs a shifting calculation on each coordinate to generate a shifted coordinate, the calculating module also generates the distances between each of the plurality of pixels and the center pixel based on the shifted coordinate and the distance between the center pixel and the initial pixel; and wherein the coordinate of the center pixel is $(x_0, y_0)$, the coordinate of the initial pixel is $(x_{0-a}, y_{0+b})$, the distance between the center pixel and the initial pixel is represented as $r(x_{0-a}, y_{0+b})$, the coordinate of a first pixel in the same row as the initial pixel is $(x_{0-a+i}, y_{0+b})$, the distance between the center pixel and the first pixel is represented as $r(x_{0-a+i}, y_{0+b})$, i is an integer, and $r(x_{0-a+i}, y_{0+b})$ is represented as:

$$r^2(x_{0-a+i}, y_{0+b}) = r^2(x_{0-a+i}-1, y_{0+b}) - ((a-i+1) \ll 1) + 1,$$

wherein $((a-i+1) \ll 1)$ represents performing the shifting calculation on $(a-i+1)$ toward left.

2. The adjusting apparatus of claim 1, wherein the gain module comprises a lens parameter adjusting module for adjusting the brightness of each of the plurality of pixels according to a predetermined lens parameter.

3. An adjusting method for adjusting the brightness of an image, the image comprising a plurality of pixels, the plurality of pixels comprising a center pixel and an initial pixel, said adjusting apparatus comprising:

a detecting module for receiving the image and detecting the brightness of each pixel among the plurality of pixels;

a calculating module coupled with the detecting module, based on a distance between the center pixel and the initial pixel, the calculating module respectively calculating a distance between each of the plurality of pixels and the center pixel; and a gain module coupled with the calculating module, based on distances between each of the plurality of pixels and the center pixel calculated by the calculating module, the gain module respectively adjusting the brightness of each of the plurality of pixels;

wherein each of the plurality of pixels is respectively corresponding to a coordinate, the calculating module respectively performs a shifting calculation on each coordinate to generate a shifted coordinate, the calculating module also generates the distances between each of the plurality of pixels and the center pixel based on the shifted coordinate and the distance between the center pixel and the initial pixel, wherein the coordinate of the center pixel is $(x_0, y_0)$, the coordinate of the initial pixel is $(x_{0-a}, y_{0+b})$, the distance between the center pixel and the initial pixel is represented as $r(x_{0-a}, y_{0+b})$, the coordinate of a second pixel in the same column as the initial pixel is $(x_{0-a}, y_{0+b-j})$, the distance between the center pixel and the second pixel is represented as $r(x_{0-a}, y_{0+b-j})$, j is an integer, and $r(x_{0-a}, y_{0+b-j})$ is represented as:

$$r^2(x_{0-a}, y_{0+b-j}) = r^2(x_{0-a}, y_{0+b-j+1}) - ((b-j+1) \ll 1) + 1,$$

wherein $((b-j+1) \ll 1)$ represents performing the shifting calculation on $(b-j+1)$ toward up.

4. The adjusting apparatus of claim 3, wherein the coordinate of a third pixel in the same row as the second pixel is $(x_{0-a+i}, y_{0+b-j})$, the distance between the center pixel and the third pixel is represented as $r(x_{0-a+i}, y_{0+b-j})$, i is an integer, and $r(x_{0-a+i}, y_{0+b-j})$ is represented as:

$$r^2(x_{0-a+i}, y_{0+b-j}) = r^2(x_{0-a+i}-1, y_{0+b-j}) - ((a-i+1) \ll 1) + 1,$$

wherein $((a-i+1) \ll 1)$ represents performing the shifting calculation on $(a-i+1)$ toward left.

5. A method of operating an adjusting apparatus for adjusting the brightness of an image, the image comprising a plurality of pixels, the plurality of pixels comprising a center pixel and an initial pixel, said method comprising the steps of:

(a) the adjusting apparatus receiving the image and detecting the brightness of each pixel among the plurality of pixels;

(b) based on a distance between the center pixel and the initial pixel, the adjusting apparatus respectively calculating a distance between each of the plurality of pixels and the center pixel; and (c) based on distances between each of the plurality of pixels and the center pixel, the adjusting apparatus respectively adjusting the brightness of each of the plurality of pixels;

wherein each of the plurality of pixels is respectively corresponding to a coordinate and the step (b) comprises:

(b1) the adjusting apparatus performing a shifting calculation on each coordinate to generate a shifted coordinate; and (b2) the adjusting apparatus generating the distances between each of the plurality of pixels and the center pixel based on the shifted coordinate and the distance between the center pixel and the initial pixel; and wherein the coordinate of the center pixel is $(x_0, y_0)$, the coordinate of the initial pixel is $(x_{0-a}, y_{0+b})$, the distance between the center pixel and the initial pixel is represented as $r(x_{0-a}, y_{0+b})$, the coordinate of a first pixel in the same row as the initial pixel is $(x_{0-a+i}, y_{0+b})$, the distance between the center pixel and the first pixel is represented as $r(x_{0-a+i}, y_{0+b})$ i is an integer, and $r(x_{0-a+i}, y_{0+b})$ is represented as:

$$r^2(x_{0-a+i}, y_{0+b}) = r^2(x_{0-a+i}-1, y_{0+b}) - ((a-i+1) \ll 1) + 1,$$

wherein $((a-i+1) \ll 1)$ represents performing the shifting calculation on $(a-i+1)$ toward left.

6. The method of claim 5, said method further comprising the step of:

(d) the adjusting apparatus adjusting the brightness of each of the plurality of pixels according to a predetermined lens parameter.

7. A method of operating an adjusting apparatus for adjusting the brightness of an image, the image comprising a plurality of pixels, the plurality of pixels comprising a center pixel and an initial pixel, said method comprising the steps of:

(a) the adjusting apparatus receiving the image and detecting the brightness of each pixel among the plurality of pixels;

(b) based on a distance between the center pixel and the initial pixel, the adjusting apparatus respectively calculating a distance between each of the plurality of pixels and the center pixel; and (c) based on distances between each of the plurality of pixels and the center pixel, the adjusting apparatus respectively adjusting the brightness of each of the plurality of pixels;

wherein each of the plurality of pixels is respectively corresponding to a coordinate and the step (b) comprises:

(b1) the adjusting apparatus performing a shifting calculation on each coordinate to generate a shifted coordinate; and (b2) the adjusting apparatus generating the distances between each of the plurality of pixels and the center pixel based on the shifted coordinate and the distance between the center pixel and the initial pixel, wherein the coordinate of the center pixel is $(x_0, y_0)$, the coordinate of the initial pixel is $(x_{0-a}, y_{0+b})$, the distance between the center pixel and the initial pixel is represented as $r(x_{0-a}, y_{0+b})$, the coordinate of a second pixel in the same column as the initial pixel is $(x_{0-a}, y_{0+b-j})$, the distance between the center pixel and the second pixel is represented as $r(x_{0-a}, y_{0+b-j})$, j is an integer, and $r(x_{0-a}, y_{0+b-j})$ is represented as:

$$r^2(x_{0-a}, y_{0+b-j}) = r^2(x_{0-a}, y_{0+b-j+1}) - ((b-j+1) \ll 1) + 1,$$

wherein $((b-j+1) \ll 1)$ represents performing the shifting calculation on $(b-j+1)$ toward up.

8. The method of claim 7, wherein the coordinate of a third pixel in the same row as the second pixel is $(x_{0-a+i}, Y_{0+b-j})$, the distance between the center pixel and the third pixel is represented as $r(x_{0-a+i}, Y_{0+b-j})$, i is an integer, and $r(x_{0-a+i}, Y_{0+b-j})$ is represented as:

$$r^2(x_{0-a+i}, y_{0+b-j}) = r^2(x_{0-a+i-1}, y_{0+b-j}) - ((a-i+1) \ll 1) + 1,$$

wherein $((a-i+1) \ll 1)$ represents performing the shifting calculation on $(a-i+1)$ toward left.

* * * * *